US011920388B2

(12) United States Patent
Murphy

(10) Patent No.: US 11,920,388 B2
(45) **Date of Patent: *Mar. 5, 2024**

(54) CHASSIS RETENTION ASSEMBLY

(71) Applicant: Schlage Lock Company LLC, Carmel, IN (US)

(72) Inventor: Nathanael S. Murphy, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 394 days.

This patent is subject to a terminal disclaimer.

(21) Appl. No.: 17/196,159

(22) Filed: Mar. 9, 2021

(65) Prior Publication Data

US 2021/0189762 A1 Jun. 24, 2021

Related U.S. Application Data

(63) Continuation of application No. 15/466,949, filed on Mar. 23, 2017, now Pat. No. 10,941,586.

(60) Provisional application No. 62/313,451, filed on Mar. 25, 2016.

(51) Int. Cl.

*E05B 9/08* (2006.01)
*E05B 9/02* (2006.01)
*E05B 15/16* (2006.01)
*E05B 55/00* (2006.01)
*E05B 63/00* (2006.01)

(52) U.S. Cl.

CPC .................. *E05B 9/08* (2013.01); *E05B 9/02* (2013.01); *E05B 15/16* (2013.01); *E05B 55/005* (2013.01); *E05B 63/006* (2013.01)

(58) Field of Classification Search

CPC ... E05B 9/08; E05B 9/02; E05B 15/16; E05B 55/005; E05B 63/006; E05B 17/0012; E05B 17/04; Y10T 292/084; Y10T 292/0976; Y10T 70/7661; Y10T 70/7655; E05C 1/04

See application file for complete search history.

(56) References Cited

U.S. PATENT DOCUMENTS 1,483,903 A * 2/1924 Masury .................... B62D 1/16 280/780
2,929,649 A * 3/1960 Coe ......................... E05C 1/163 292/357
3,190,683 A 6/1965 Schlage
3,209,569 A 10/1965 Bryson et al.
3,853,341 A 12/1974 MacDonald
3,909,052 A 9/1975 James
4,729,585 A 3/1988 Lin (Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

A retention bracket configured for use with a latch mechanism including a laterally extending housing. The retention bracket includes a first wall, a second wall, a collar, and a deformable section. The first and second walls are longitudinally offset from one another and are structured to receive the housing therebetween. The collar extends longitudinally outward from one of the walls and defines an opening having an effective diameter. The deformable section has a natural state in which the effective diameter is a first diameter, and a deformed state in which the effective diameter is a second diameter greater than the first diameter.

20 Claims, 11 Drawing Sheets

(56) References Cited

U.S. PATENT DOCUMENTS

| | | | | | |
|---|---|---|---|---|---|
| 4,871,202 | A | * | 10/1989 | Friedrichs | E05C 1/163 70/450 |
| 4,974,883 | A | * | 12/1990 | Jans | E05C 1/163 292/169.14 |
| 5,211,432 | A | | 5/1993 | Lin | |
| 5,249,444 | A | * | 10/1993 | Dancs | E05B 17/04 292/DIG. 64 |
| 5,257,837 | A | | 11/1993 | Bishop | |
| 5,474,346 | A | | 12/1995 | Fann et al. | |
| 5,562,314 | A | | 10/1996 | Wheatland et al. | |
| 5,611,581 | A | | 3/1997 | Ghostley | |
| 5,620,211 | A | | 4/1997 | Ellis | |
| 5,662,365 | A | | 9/1997 | Ghostley | |
| 5,683,127 | A | | 11/1997 | Chamberlain | |
| 5,769,472 | A | | 6/1998 | Small | |
| 5,957,510 | A | | 9/1999 | Kuo | |
| 6,161,404 | A | * | 12/2000 | Westwinkel | E05B 9/084 70/370 |
| 6,419,288 | B1 | | 7/2002 | Wheatland | |
| 6,494,504 | B1 | | 12/2002 | Fan | |
| 6,863,320 | B2 | | 3/2005 | Huang | |
| 6,880,871 | B2 | | 4/2005 | Winardi | |
| 7,275,773 | B1 | | 10/2007 | Weathersby et al. | |
| 7,634,927 | B1 | * | 12/2009 | Tien | E05B 13/004 70/DIG. 60 |
| 7,900,489 | B2 | | 3/2011 | Roth et al. | |
| 8,052,178 | B2 | * | 11/2011 | MacDonald | E05B 17/0012 292/DIG. 64 |
| 10,907,672 | B1 | * | 2/2021 | John | F16B 19/02 |
| 2004/0130162 | A1 | | 7/2004 | Don et al. | |
| 2007/0052245 | A1 | | 3/2007 | Bodily et al. | |
| 2007/0170607 | A1 | * | 7/2007 | Eiha | B29C 45/2606 425/808 |
| 2007/0205606 | A1 | | 9/2007 | Shen | |
| 2007/0216167 | A1 | | 9/2007 | Wu | |
| 2008/0023969 | A1 | * | 1/2008 | MacDonald | E05C 1/04 292/145 |
| 2014/0008922 | A1 | | 1/2014 | Ohl et al. | |
| 2016/0215525 | A1 | | 7/2016 | Ramakrishna | |

* cited by examiner

CHASSIS RETENTION ASSEMBLY

CROSS-REFERENCE TO RELATED APPLICATIONS

The present application is a continuation of U.S. patent application Ser. No. 15/466,949 filed Mar. 23, 2017 and issued as U.S. Pat. No. 10,941,586, which claims the benefit of U.S. Provisional Patent Application No. 62/313,451 filed Mar. 25, 2016, the contents of each application incorporated herein by reference in their entirety.

TECHNICAL FIELD

The present disclosure generally relates to locksets, and more particularly, but not exclusively, relates to tubular locksets.

BACKGROUND

Tubular locksets for doors often include a latch mechanism and pair of chassis assemblies positioned on opposite sides of the latch mechanism. Certain conventional locksets of this type have certain limitations, such as those relating to ease of installation. For a tubular style lockset, the configuration of the structural and actuating interfaces between the chassis and the latch mechanism often has a large effect on the ease of the installation process. The structural interface ensures that the chassis is temporarily supported until the lockset can be secured to the door using the provided mounting screws, and the actuating interface transmits rotation of the handle to the latch mechanism. Described below are certain conventional combinations of structural and actuating interfaces.

The actuating interface is typically formed between the latch mechanism and a spindle of the outside chassis such that the spindle is operable to drive the latch. In certain locksets, the outside chassis includes a single drive spindle that passes through the latch mechanism and rotationally couples the outside handle to the inside handle. Other locksets utilize a "split-spindle" or "dual spindle" configuration, in which each half-spindle interfaces with the latch independently of the other, such that the outside and inside handles are rotationally decoupled. Described below are examples of conventional locksets including a single spindle actuating interface (FIGS. 11 and 12) and a split spindle actuating interface (FIG. 13).

Regarding the structural interface, the outside chassis also typically includes threaded posts for receiving the mounting screws. In certain locksets, these mounting posts are horizontally offset from one another and pass directly through the latch mechanism. In other locksets, the mounting posts are vertically offset from one another and pass around the latch mechanism, and additional material is needed to interface the outside chassis to the latch mechanism. The additional material may be provided as an extension of the chassis, or may be provided as a separate alignment component through which the chassis and the latch mechanism are indirectly engaged with one another. Described below are examples of conventional locksets including horizontally offset mounting posts (FIG. 11), vertically offset mounting posts with additional material formed on the chassis (FIG. 12), and vertically offset mounting posts with additional material in the form of an alignment component (FIG. 13).

In these conventional arrangements, the interface of chassis to latch often requires design clearances to allow the mechanisms to assemble with relative ease, considering anticipated manufacturing tolerances. These clearances may prevent the latch from being able to maintain the chassis in a fixed position during the installation process. During installation, if even a slight axial force is imparted to the outside chassis via the spindle or mounting posts, the chassis assembly is prone to shift away from the door surface. In the case of split spindle configurations, the individual spindles are typically spring loaded to accommodate doors of varying thicknesses, and this spring load pushes the chassis away from the door surface. Such shifting of the outside chassis during installation can lead to an undesirable increase in installation difficulty. Further details regarding such conventional arrangements and the limitations thereof are described below with reference to FIGS. 11-13. In light of these and other limitations, there remains a need for further improvements in this technological field.

SUMMARY

An exemplary retention bracket is configured for use with a latch mechanism including a laterally extending housing. The retention bracket includes a first wall, a second wall, a collar, and a deformable section. The first and second walls are longitudinally offset from one another and are structured to receive the housing therebetween. The collar extends longitudinally outward from one of the first wall and the second wall, and defines an opening having an effective diameter. The deformable section has a natural state in which the effective diameter is a first diameter, and a deformed state in which the effective diameter is a second diameter greater than the first diameter. Further embodiments, forms, features, and aspects of the present application shall become apparent from the description and figures provided herewith.

DETAILED DESCRIPTION OF ILLUSTRATIVE EMBODIMENTS

Figure 1:
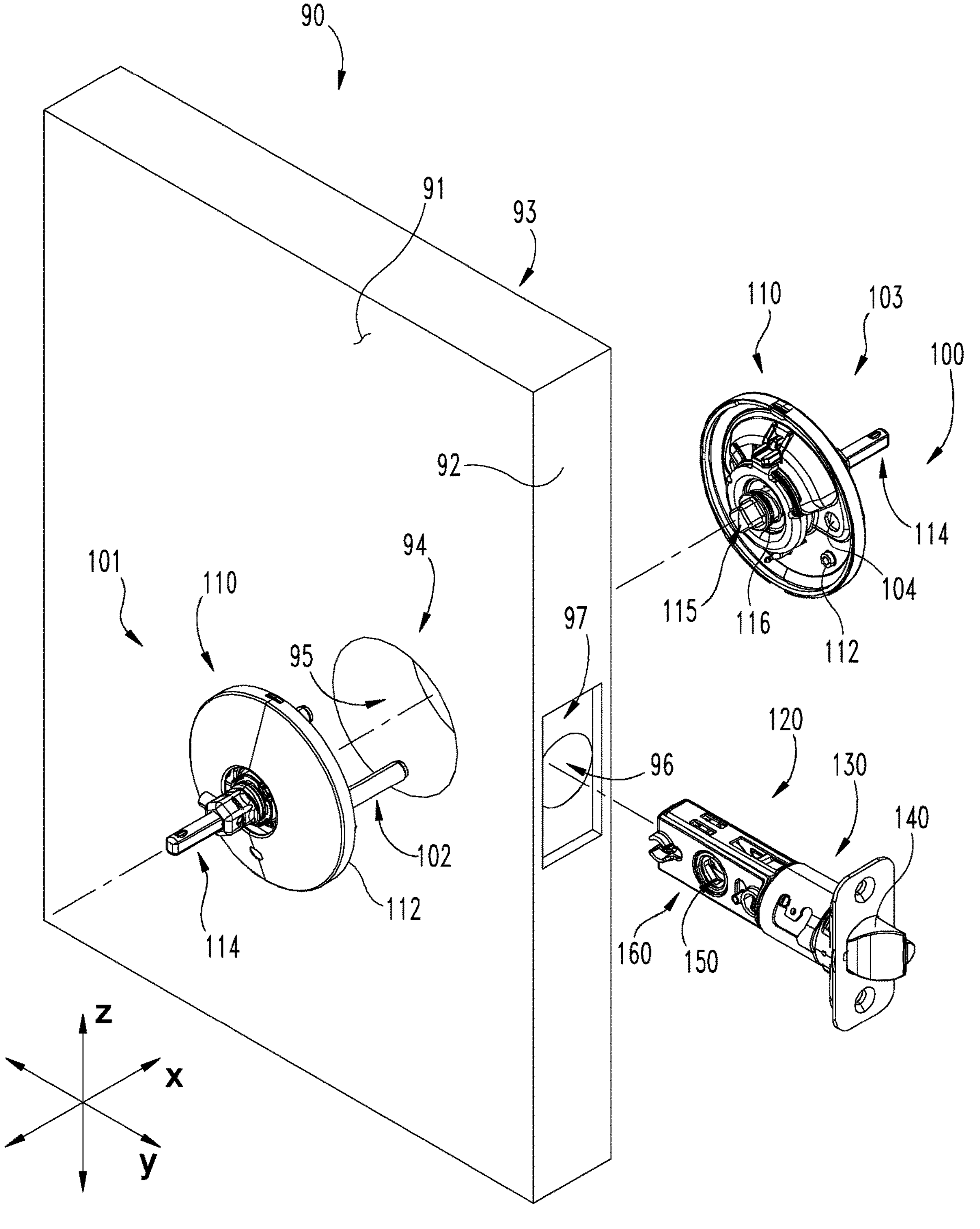
FIG. 1 is an exploded assembly view of a lockset according to one embodiment and a door.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms "longitudinal," "lateral," and "transverse" are used to denote directions defined by three mutually perpendicular axes. In the coordinate system illustrated in FIG. 1, the X-axis defines the longitudinal directions, the Y-axis defines the lateral directions, and the Z-axis defines the transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

With reference to FIG. 1, a lockset 100 according to one embodiment includes a pair of chassis assemblies 110 configured for mounting opposite sides of a door 90, and a latch mechanism 120 positioned between and engaged with the chassis assemblies 110. The latch mechanism 120 includes a housing 130, a latchbolt 140 slidably mounted in the housing 130, a retractor 150 rotatably mounted in the housing 130 and engaged with the latchbolt 140, and a chassis retention mechanism, which in the illustrated form is provided as a chassis retention bracket 160 coupled to the housing 130. The lockset 100 may further include a pair of handles (e.g., knobs or levers) mounted to the chassis assemblies 110 to enable a user to operate the lockset 100.

In the descriptions that follow, "longitudinally outward" and "longitudinally inward" may be used to refer to longitudinal directions with respect to an origin point, such as a longitudinal center point of the assembled lockset 100. More specifically, "longitudinally outward" is a direction away from the origin point, and "longitudinally inward" is a direction toward the origin point. In the illustrated form, the longitudinal center point of the assembled lockset 100 is defined within the retractor between two longitudinally offset arms of the retention bracket 160. When the lockset 100 is assembled and installed on the door 90, the longitudinally outward direction extends toward a user of the lockset 100, and the longitudinally inward direction extends away from the user. As such, the longitudinally outward direction may alternatively be referred to as a "proximal" direction, and the longitudinally inward direction may alternatively be referred to as a "distal" direction.

The door 90 has an outer side 91, an edge 92, and an inner side 93. The door 90 also includes a door preparation 94, which includes a cross bore 95, an edge bore 96, and a recess 97. The cross bore 95 extends longitudinally through the door 90 between the outer side 91 and the inner side 93. The edge bore 96 extends laterally inward from the door edge 92, and intersects the cross bore 95. The recess 97 is formed in the door edge 92 and circumferentially surrounds the laterally outer face of the edge bore 96. The door preparation 94 may be an industry-standard tubular door preparation in which the edge bore 96 has a nominal diameter of one inch.

Each chassis assembly 110 includes a housing 112, a drive spindle 114 rotatably mounted to the housing 112, and a spring 116 engaged with the housing 112 and the drive spindle 114. The housing 112 is sized and configured to cover the open face of the cross bore 95. The distal end of the drive spindle 114 includes a hub 115 structured to engage the retractor 150. When the hub 115 is engaged with the retractor 150, rotation of the drive spindle 114 actuates the retractor 150, thereby laterally moving the latchbolt 140. The drive spindle 114 is longitudinally movable with respect to the housing 112, thereby enabling the hub 115 to engage the retractor 150 in doors having different thicknesses in the longitudinal direction. Additionally, the spring 116 is connected between the housing 112 and the drive spindle 115, and urges the housing 112 and drive spindle 114 in opposite longitudinal directions. When the chassis 100 is connected to the latch mechanism 120, the spring 116 urges the drive spindle 114 longitudinally inward, thereby maintaining engagement between the hub 115 and the retractor 150.

One of the chassis assemblies 110 is an outside chassis 101 configured for mounting on the outer side 91 of the door 90, and the other chassis assembly 110 is an inside chassis assembly 103 configured for mounting on the inner side 93 of the door 90. In the illustrated form, the outside chassis 101 includes a pair of laterally spaced mounting posts 102, and the inside chassis 103 includes a pair of laterally spaced openings 104 aligned with the posts 102. It is also contemplated that these features may be reversed, such that the outside chassis 101 includes the openings 104 and the inside chassis 103 includes the mounting posts 102. The chassis assemblies 110 may be coupled to one another by a pair of fasteners 106 (FIG. 7) which extend through the openings 104 and engage the mounting posts 102.

Figure 2:
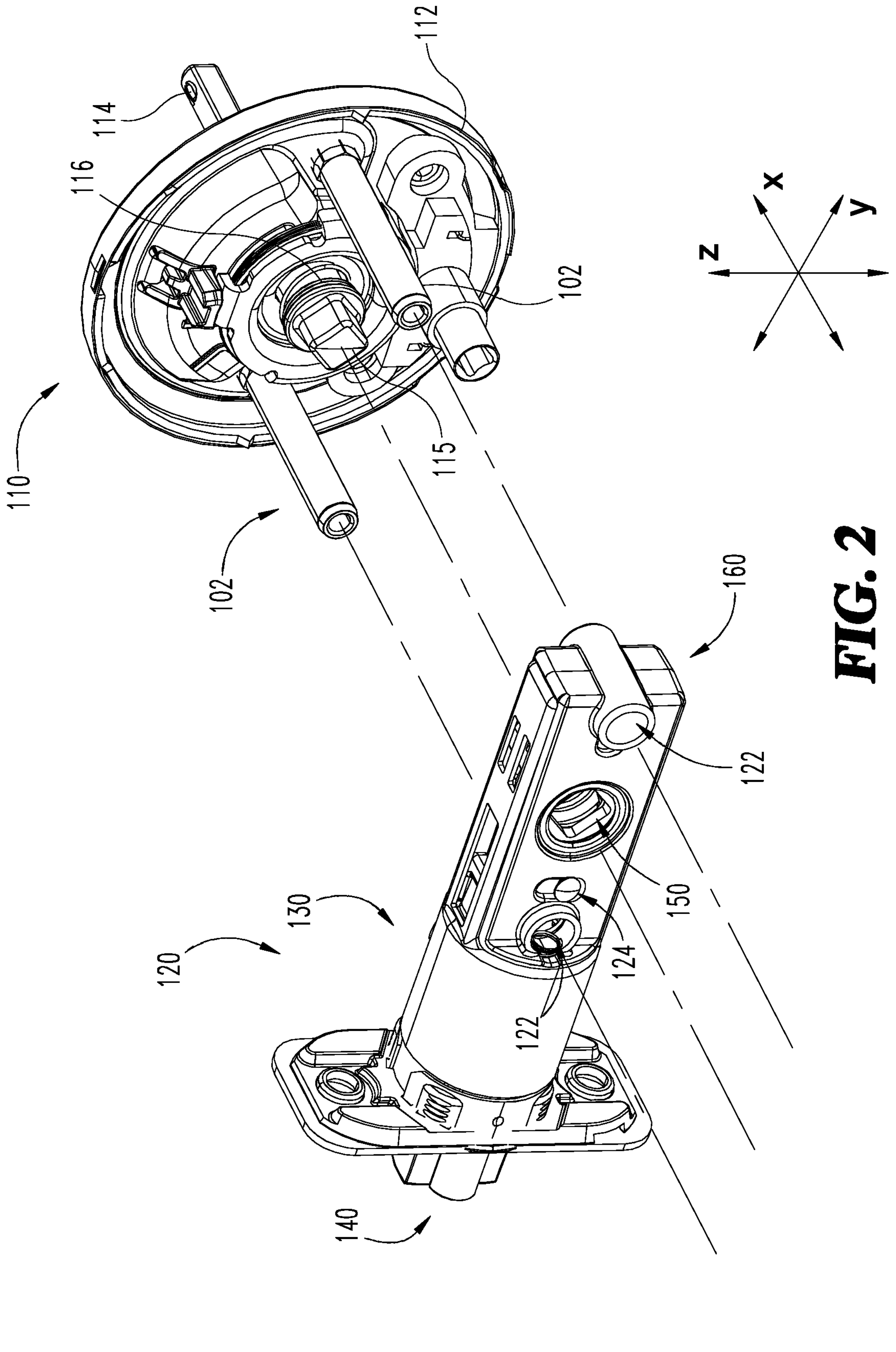
FIG. 2 is a partially-exploded perspective illustration of a portion of the lockset illustrated in FIG. 1.

With additional reference to FIG. 2, the latch mechanism 120 includes a pair of laterally spaced openings 122 operable to receive the mounting posts 102, and may further include a fastener, such as a rivet 124, which couples the retention bracket 160 to the housing 130. The latch mechanism 120 includes a stem 126 which extends laterally inward from a faceplate 127. The stem 126 is configured to extend laterally through the edge bore 96 and into the cross bore 95, and the faceplate 127 is configured to be received in the recess 97. The stem 126 includes the housing 130, the retractor 150, and the retention bracket 160. As described in further detail below, the latch mechanism 120 has a footprint 129 (FIG. 5) defined by the stem 126. The footprint 129 fits within the envelope of the edge bore 96, such that the edge bore 96 is operable to receive the stem 126.

Figure 3:
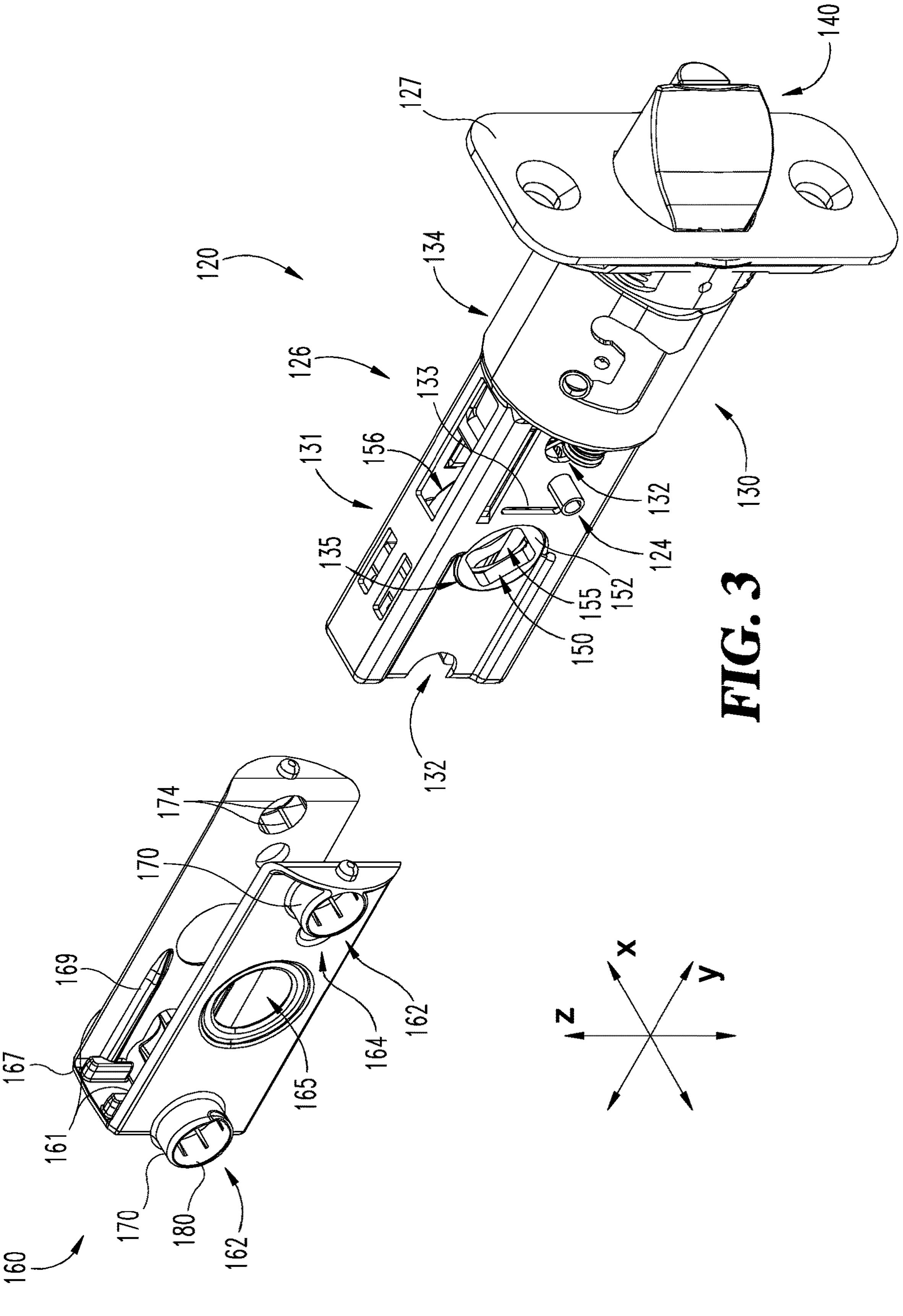
FIG. 3 is an exploded perspective illustration of a latch mechanism including a retention bracket according to one embodiment.

With additional reference to FIG. 3, the housing 130 includes a case 131 and a cylindrical barrel 134. While other forms are contemplated, the geometry of the case 131 is generally that of a parallelepiped. Two laterally spaced openings 132 extend longitudinally through the case 131 and partially define the openings 122 of the latch mechanism 120. The case 131 also includes an aperture 135 which is positioned between the openings 122 and provides access to the retractor 150. The case 131 may further include a slot 133 for engaging a tab of the retention bracket 160. The barrel 134 may define a maximum outer diameter of the stem 126, and the cross-sectional geometry of the barrel 134 may define the footprint 129 of the stem 126.

The latchbolt 140 is slidably received in the barrel 134 and extends through an opening in the faceplate 127. The latchbolt 140 is laterally movable between an extended position in which the latchbolt 140 protrudes beyond the faceplate 127, and a retracted position in which the latchbolt 140 is at least partially retracted within the barrel 134.

Additionally, the latchbolt 140 may be biased toward the extended position. As described in further detail below, the latchbolt 140 is configured to move laterally in response to actuation of the retractor 150.

The retractor 150 includes a pair of cam plates 152, which are operably connected to the latchbolt 140 via a linkage 156. The cam are plates 152 rotatably mounted in the case 131 and aligned with the aperture 135. Each of the cam plates 152 includes an opening 155 sized and configured to receive the drive spindle hub 115. The cam plates 152 are independently rotatable with respect to the case 150, and may be biased toward a home position. The cam plates 152 are engaged with the latchbolt 140 via the linkage 156, and the linkage 156 is structured to retract the latchbolt 140 in response to rotation of the cam plates 152 from the home position. The cam plates 152 may be independently engaged with the linkage 156 such that each cam plate 152 is operable to retract the latchbolt 140 without causing rotation of the other cam plate 152. While the illustrated retractor 150 includes a pair of rotatable cam plates 152, it is also contemplated that the retractor 150 may take another form. For example, a retractor may instead include one or more sliding elements which retract the latchbolt 140 in response to rotation of the drive spindle 114. In such forms, the sliding elements may directly engage the drive spindle 114, and the linkage 156 may be omitted.

The retention bracket 160 is mounted on the exterior of the case 131, and may be secured to the housing 130 by a fastener, such as the rivet 124. In the illustrated form, the retention bracket 160 includes a pair of laterally extending walls 161 which are positioned on opposite longitudinal sides of the case 131. Each wall 161 includes a pair of laterally spaced openings 162 and an aperture 165 formed between the openings 162. One or both of the walls 161 may include a slot 164 through which the retention bracket 160 is coupled to the housing 130, for example by the rivet 124. In certain embodiments, the retention bracket 160 may be coupled to the housing 130 at the time of manufacture, such that the latch mechanism 120 is fully assembled at the time of sale to an end user. In other embodiments, the retention bracket 160 may be provided as an add-on for an existing latch mechanism 120. In such forms, the retention bracket 160 may be configured to engage the case 131 in another manner, such as via an interference fit, a snap fit, or another form of coupling.

With the retention bracket 160 mounted on the housing 130, the bracket openings 162 are aligned with the housing openings 132, thereby defining the latch mechanism openings 122. Additionally, the bracket apertures 165 are aligned with the housing apertures 135 such that the retractor 150 is accessible to the drive spindle 114. The bracket 160 may further include a plurality of laterally extending ridges 169 formed on the longitudinally inner surfaces of the walls 161. In such embodiments, the ridges 169 may engage the case 131 in an interference or frictional fit to partially secure the bracket 160 to the housing 130. In embodiments in which the rivet 124 or another form of permanent mechanical fastener is utilized, such engagement may partially secure the bracket 160 to the housing 130 prior to installation of the rivet 124. In other embodiments, the interference or frictional fit may secure the bracket 160 to the housing 130 without requiring the use of additional fasteners.

Figure 4:
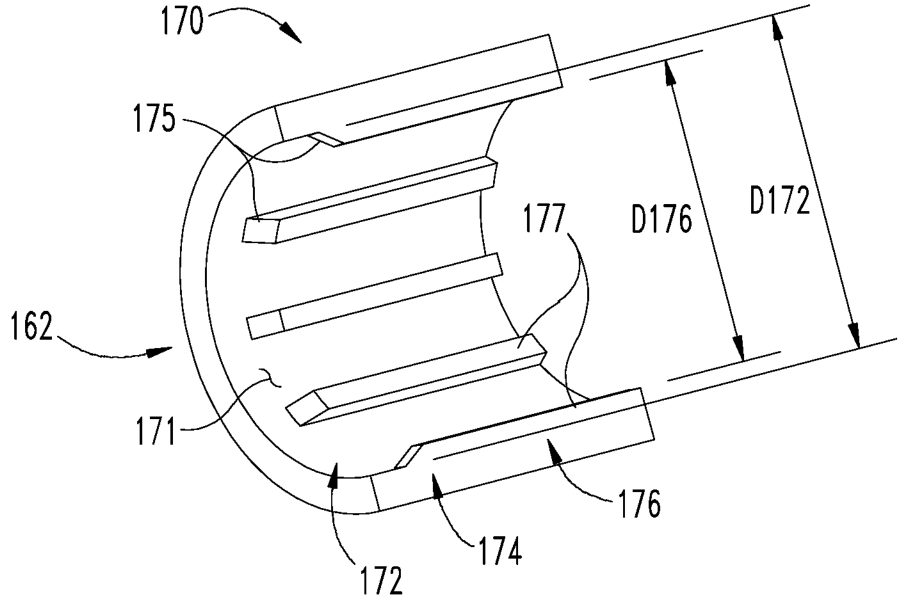
FIG. 4 is a cross-sectional illustration of a portion of the retention bracket illustrated in FIG. 3.

With additional reference to FIG. 4, each of the openings 162 is defined by a collar 170, such that each pair of laterally spaced openings 162 is defined by a corresponding pair of laterally offset collars 170. In the illustrated embodiment, each pair of collars 170 extends longitudinally outward from a corresponding one of the walls 161. Additionally, each of the illustrated collars 170 includes an inner surface 171, a proximal entry section 172 having a primary inner diameter D172, an intermediate chamfered section 174, and a distal ribbed section 176 having a reduced inner diameter D176.

In the entry section 172, the primary inner diameter D172 is defined by the inner surface 171. The primary inner diameter D172 is greater than an outer diameter D102 of the mounting posts 102. As such, the entry section 172 is operable to receive the mounting post 102 with a clearance fit. In other words, the mounting post 102 may be inserted into the illustrated entry section 172 without engaging or causing deformation of the bracket 160.

The chamfered section 174 includes a plurality of ramps 175, each of which projects radially inward from the inner wall 171 and extends longitudinally. The ramps 175 are angularly offset from one another with respect to a longitudinal axis of the collar 170. The proximal ends of the ramps 175 may be flush with the inner surface 171, and the distal ends of the ramps 175 are positioned radially inward of the inner surface 171. The chamfered section 174 thus provides a lead-in chamfer which reduces the inner diameter of the opening 162 from the primary inner diameter D172 to the reduced inner diameter D176. As described in further detail below, the lead-in chamfer provided by the chamfered section 174 aids initial engagement of the outside chassis 101 with the latch mechanism 120, and assists in guiding and centering the mounting posts 102 for insertion through the openings 122.

The ribbed section 176 includes a plurality of ribs 177, which together form a compliant element 180 of the retention bracket 160. Each rib 177 extends distally from the distal end of a corresponding one of the ramps 175. The ribs 177 are angularly offset from one another with respect to a longitudinal axis of the collar 170. Each rib 177 projects radially inward from the inner surface 171, thereby providing the ribbed section 176 with the reduced inner diameter D176. The ribbed section 176 thus has a maximum inner diameter D172 defined by the inner surface 171, and a minimum inner diameter D176 defined by the ribs 177.

As described in further detail below, the reduced inner diameter D176 is less than the mounting post outer diameter D102, such that the ribbed section 176 is operable to receive the mounting post 102 with an interference fit. More specifically, the ribs 177 provide a compliant frictional interference with the outside surface of the mounting post 102. The developed friction resists moderate axial forces that might be applied to the outside chassis 101 during installation, including that of the spring 116. During the installation process, the interference fit may reduce longitudinal shifting of the outside chassis 101, thereby maintaining the chassis 101 in close proximity to or in abutment with the door surface 91.

The retention force provided by the bracket 160 may be adjusted by appropriate selection of one or more design characteristics, such as the number, thickness, and radial height of the ribs 177, the value of the reduced inner diameter D176, and/or the longitudinal length of the ribbed section 176. For example, the retention force may be altered by providing the ribbed section 176 with a greater or lesser reduced inner diameter D176, thereby altering the amount of radial interference between the ribbed section 176 and the post 102. Additionally or alternatively, the retention force may be altered by providing the ribbed section 176 with a greater or lesser longitudinal length, thereby altering the longitudinal length of the interference fit. In certain embodiments, the retention bracket 160 may further include mechanical snaps operable to supplement the axial force resistance provided by the frictional interference fit.

The retention force provided by the bracket 160 may also be adjusted by appropriate selection of one or more manufacturing options, such as the material of which the mounting bracket 160 is formed and/or the manufacturing process by which the bracket 160 is produced. The retention bracket 160 may be made from any number of compliant materials and associated manufacturing processes, so long as an adequate retention force is developed. In certain forms, the bracket 160 may be formed of a different material than the housing 130. For example, the housing 130 may be formed of a material that is not conducive to a compliant interference fit, such as unhardened low-carbon steel, and the retention bracket 160 may be formed of a material that is more compliant and/or less rigid than the material of the housing 130.

In the illustrated retention bracket 160, each pair of collars 170 is formed on a corresponding one of the sidewalls 161, and the sidewalls 161 are connected by an end wall 167. In an alternative form of retention mechanism, the walls 161 need not be directly connected to one another, and may be individually mounted on opposite sides of the case 131. In other embodiments, a chassis retention mechanism may include a single wall 161 mounted on the side of the case 131 that faces the outside chassis 101. In further embodiments, a chassis retention mechanism need not include the walls 161, and one or more of the collars 170 may be individually mounted to the case 131.

Figure 5:
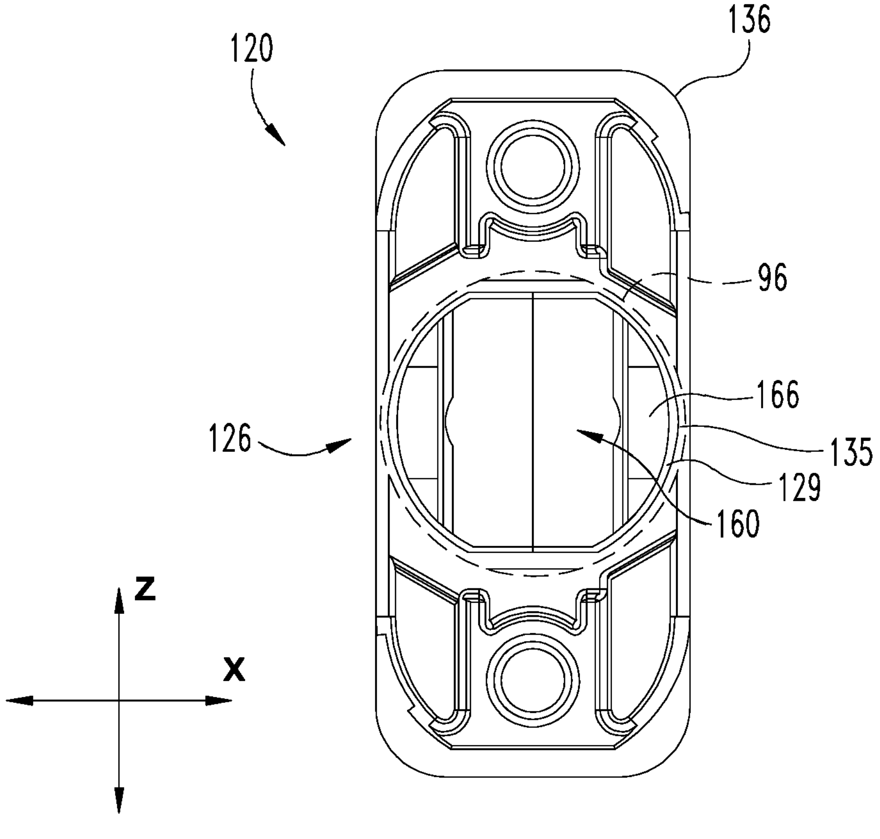
FIG. 5 is an end view of the latch mechanism illustrated in FIG. 3.

With additional reference to FIG. 5, illustrated therein is an end view of the latch mechanism 120 along with a representation of the edge bore 96. As indicated above, the latch mechanism 120 has a footprint 129 that is defined by the stem 126. The footprint 129 of the latch mechanism 120 may be defined as the largest geometry that the stem 126 occupies in the longitudinal-transverse (X-Z) plane. In other words, the footprint 129 is a cross-section of the latch mechanism 120 in a plane perpendicular to the lateral axis (Y). As such, the footprint 129 may alternatively be referred to as a lateral footprint or lateral cross-section. In the illustrated form, the largest geometry of the stem 126 is provided by the barrel 134, such that a footprint 135 of the barrel 134 defines the footprint 129 of the stem 126. In other forms, the stem footprint 129 may be defined by additional or alternative features of the stem 126. Additionally, while the illustrated stem footprint 129 is defined by a single portion of the stem 126, it is also contemplated that the footprint 129 may be defined by two or more portions of the stem 126 that are laterally offset from one another.

In order for stem 126 to be received in the edge bore 96 without interference, the footprint 129 may need to be capable of fitting within the envelope defined by the edge bore 96. Accordingly, the footprint 129 may be sized to fit within the envelope or lateral cross-section of the edge bore 96. In the illustrated embodiment, the retention bracket 160 fits entirely within the barrel footprint 135, and therefore does not expand the footprint 129 of the latch mechanism 120. Due to the fact that the retention bracket 160 does not alter the footprint 129, the assembled latch mechanism 120, including the retention bracket 160, fits within the envelope of the standard edge bore 96. As a result, the retention bracket 160 can be fixedly mounted to the housing 130 prior to installation of the lockset 100 on the door 90, and the assembled latch mechanism 120 may be included in the lockset 100 at the time of sale to an end user. In the illustrated form, the envelope of the edge bore 96 is defined by a circle having a diameter of one inch, and the footprint 129 fits within the circle. Thus, the stem 126 of the latch mechanism 120, including the retention bracket 160, is configured to be received in a standard edge bore 96 having a one-inch diameter.

In the illustrated form, the retention bracket 160 fits entirely within the existing footprint 129 of the stem 126. It is also contemplated that the retention bracket 160 may fit substantially entirely within the existing stem footprint 129. The term "substantially" as used herein may be applied to modify a quantitative representation which could permissibly vary without resulting in a change in the basic function to which it is related. For example, the retention bracket 160 could permissibly protrude beyond the footprint 129 by a small amount, for example as a result of tolerances in the manufacturing and/or assembly of the latch mechanism 120. In such cases, the retention bracket 160 may nonetheless be considered to fit substantially entirely within the footprint 129 so long as the incongruity does not materially alter the ability of the stem 126 to be inserted into the edge bore 96. In further forms, the retention bracket 160 itself may define the footprint 129 of the stem 126. In such forms, the retention bracket 160 may define the footprint 129 to fit within a circle having a diameter of one inch such that the assembled latch mechanism is sized and configured to be received in the one-inch diameter edge bore 96.

During installation of the lockset 100 on the door 90, the assembled latch mechanism 120 is mounted in the door preparation 94. More specifically, the laterally inner portion of the stem 126, which includes the case 131 and the retention bracket 160, is inserted into the edge bore 96. The latch mechanism 120 is then urged laterally inward such that the case 131 and retention bracket 160 enter the cross bore 95, the barrel 134 enters the edge bore 96, and the faceplate 127 enters the recess 97. With the faceplate 127 received in the recess 97, the openings 122 of the latch mechanism 120 are substantially parallel to the longitudinal axis defined by the cross bore 94. The outside chassis 101 may then be attached to the latch mechanism 120.

Figure 6:
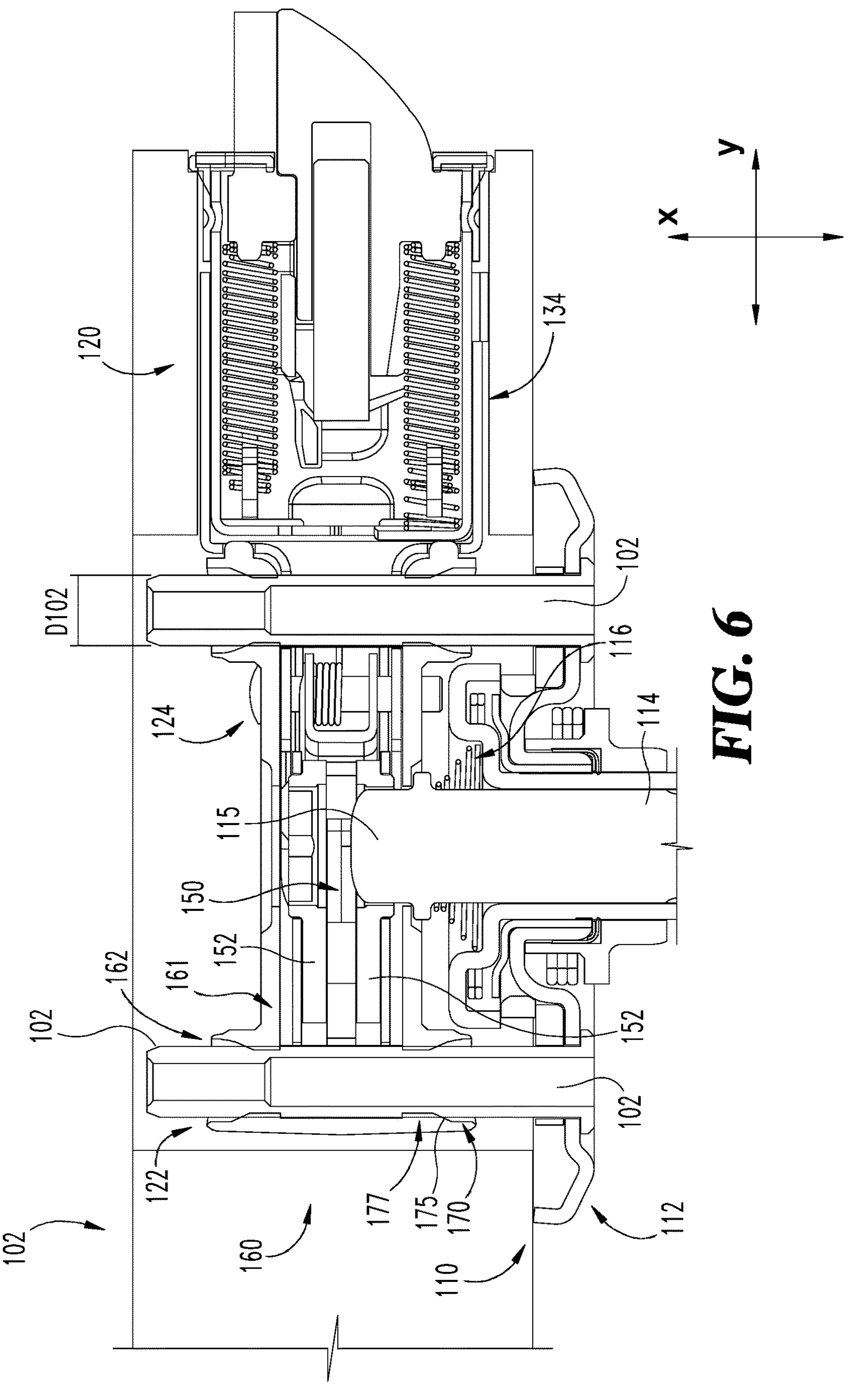
FIGS. 6 and 7 are cross-sectional illustrations of the lockset illustrated in FIG. 1 during an installation procedure.

With additional reference to FIG. 6, attaching the outside chassis 101 to the latch mechanism 120 includes inserting the distal ends of the mounting posts 102 into the retention bracket openings 162. As noted above, each of the openings 162 is defined in part by the entry section 172, which has an inner diameter D172 greater than the outer diameter D102 of the posts 102. As a result, of the disparity in diameters, insertion of the mounting posts 102 into the openings 162 is facilitated. With the posts 102 received in the entry sections 172, the outside chassis 101 is urged longitudinally inward such that the posts 102 enter the chamfered sections 174 and engage the ramps 175. As the posts 102 travel through the chamfered sections 174, the ramps 175 engage the posts 102 and urge the posts 102 and the openings 162 into alignment.

As will be appreciated, the effective diameter of the openings 162 corresponds to the diameter D176 of the ribbed section 176. Prior to insertion of the mounting posts 102, the ribs 177 of the compliant element 180 may be in an undeformed or natural state, in which the effective diameter or ribbed section diameter D176 is a first diameter. As the posts 102 enter the ribbed sections 176, the posts 102 engage and deform the ribs 177 of the compliant element 180. As a result, the compliant element 180 is transitioned to a deformed state, and the effective diameter or ribbed section diameter D176 increases to a second diameter. As a result of the deformed state, the ribs 177 a frictional interference fit is formed between each post 102 and corresponding ribbed section 176.

As the outside chassis 101 continues to be urged toward the inner side 93 of the door 90, the drive spindle hub 115 enters the opening 155 of the outside cam plate 152, and the housing 120 comes into contact with the door outer surface 91. In this state, the drive spindle 114 is engaged with the retractor 150. With the latch mechanism 120 longitudinally anchored to the door 90, the spring 116 urges the outside chassis 101 longitudinally outward. The frictional interference fit formed between the posts 102 and the retention bracket 160 is operable to generate a resistive force greater than the force generated by the spring 116. The interference fit counters the longitudinally outward force of the spring 116, thereby retaining the housing 120 in close proximity or abutment with the door outer surface 91. As a result, the position of the partially installed lockset 100 is maintained, enabling the installer to use both hands when installing the inside chassis 103.

Figure 7:
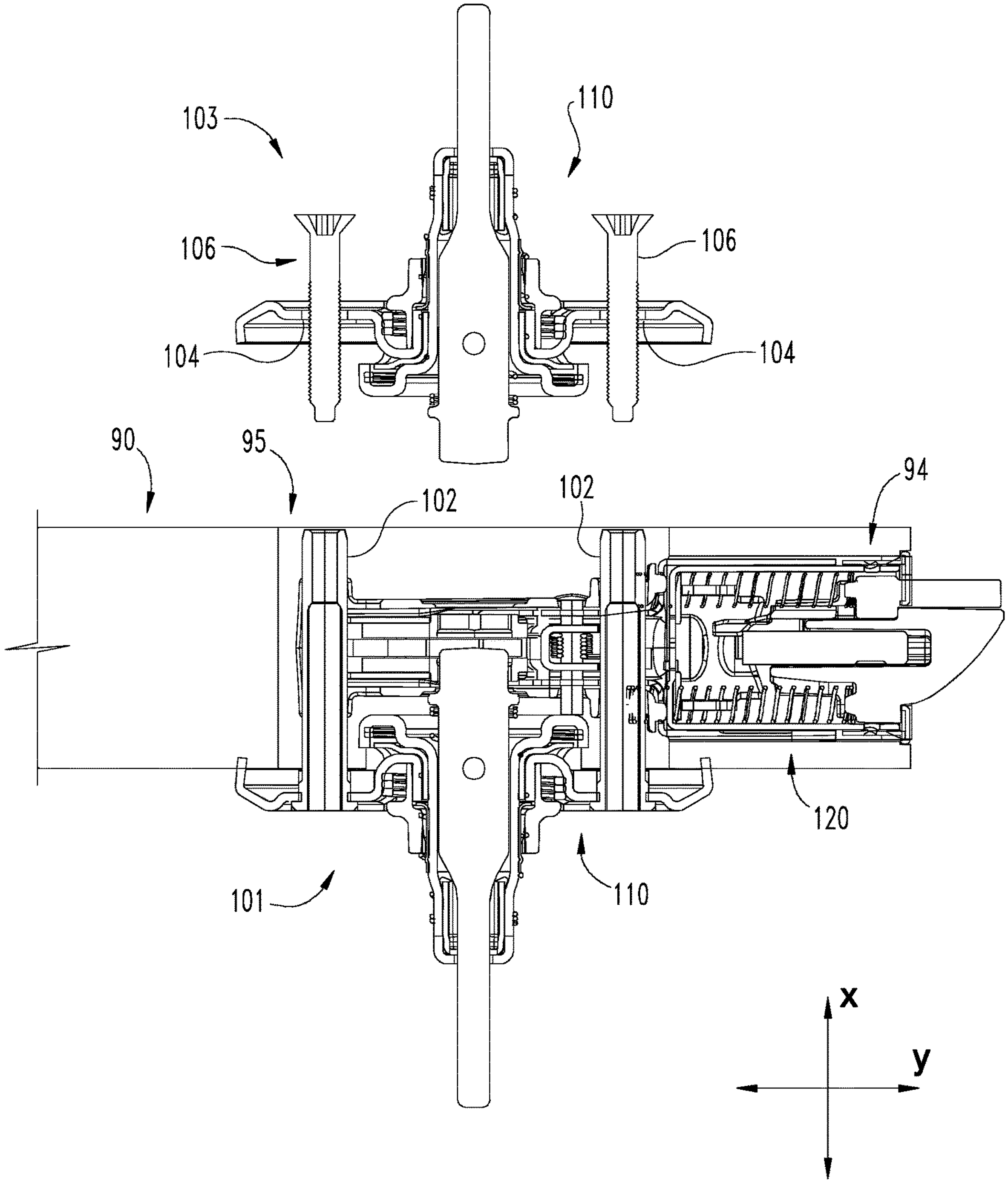

With additional reference to FIG. 7, installing the inside chassis 103 includes placing the housing 120 against the door inside surface 93 such that the openings 104 are aligned with the mounting posts 102 and the drive spindle hub 115 is engaged with the inside cam plate 152 of the retractor 150. Fasteners may then be inserted into the mounting posts 102 through the openings 104. For example, a pair of screws 106 may be screwed into the posts 102 through the openings 104 to secure the inside chassis 103 to the outside chassis 101. With the chassis assemblies 110 secured to one another and engaged with the latch mechanism 120, the lockset 100 is mounted on the door 90. A rose plate may be mounted on the housing 120 of the inside chassis 103 to cover the screws 106, and a handle may be mounted on each of the chassis assemblies 110 to complete the installation procedure.

With the lockset 100 assembled, the hub 115 of each drive spindle 114 is received in the opening 155 of the corresponding cam plate 152. As noted above, the cam plates 152 are rotatable with respect to one another and are operable to independently engage the linkage 156. As a result, each drive spindle 114 is independently operable to retract the latchbolt 140, thereby enabling the lockset 100 to provide the benefit of independently operable handles.

Figure 8:
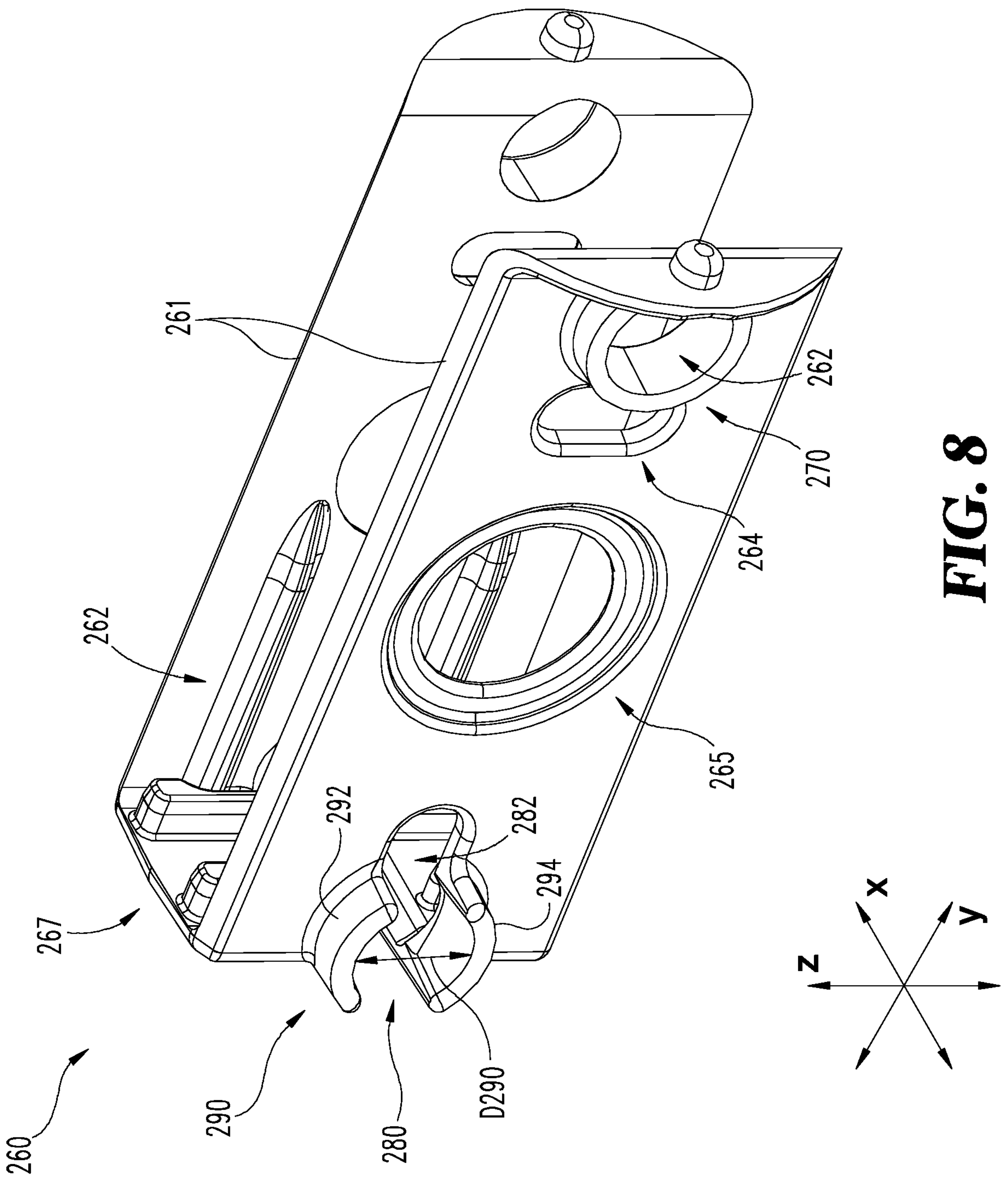
FIG. 8 is a perspective illustration of a retention mechanism according to another embodiment.

FIG. 8 illustrates a retention mechanism 260 according to another embodiment. The retention mechanism 260 is substantially similar to the retention mechanism 160 described above. Unless stated otherwise, similar reference characters are used to indicate similar elements and features. For example, the retention mechanism 260 includes a pair of walls 261 extending laterally from an end piece 267, a plurality of collars 270 extending longitudinally from the walls 261, and a plurality of openings 262 defined by the collars 270. In the interest of conciseness, the following description of the retention mechanism 260 focuses primarily on features that are different from those described above with reference to the retention mechanism 160.

In the instant embodiment, the frictional interference fit is not provided by ribs, but is instead provided by a compliant element in the form of a living hinge 280. More specifically, a slot 282 extends laterally from the end piece 267 through one of the collars 270 on each side of the retention mechanism 260. As a result, one of the collars 270 on each side is defined as a split collar 290 having an upper lip 292 and a lower lip 294. With the living hinge 280 in its natural or undeformed state, the split collar 290 has an effective inner diameter D290 less than the outer diameter D102 of the mounting post 102. When the mounting post 102 enters the split collar 290 during installation, the living hinge 280 flexes as the mounting post 102 urges the upper and lower lips 292, 294 apart from one another, thereby transitioning the living hinge 280 to a deformed state in which the effective inner diameter D290 corresponds to the outer diameter D102 of the mounting posts. In the deformed state, the living hinge 280 urges the upper and lower lips 292, 294 toward each other, thereby forming a frictional interference fit between the split collar 290 and the mounting post 102.

Figure 9:
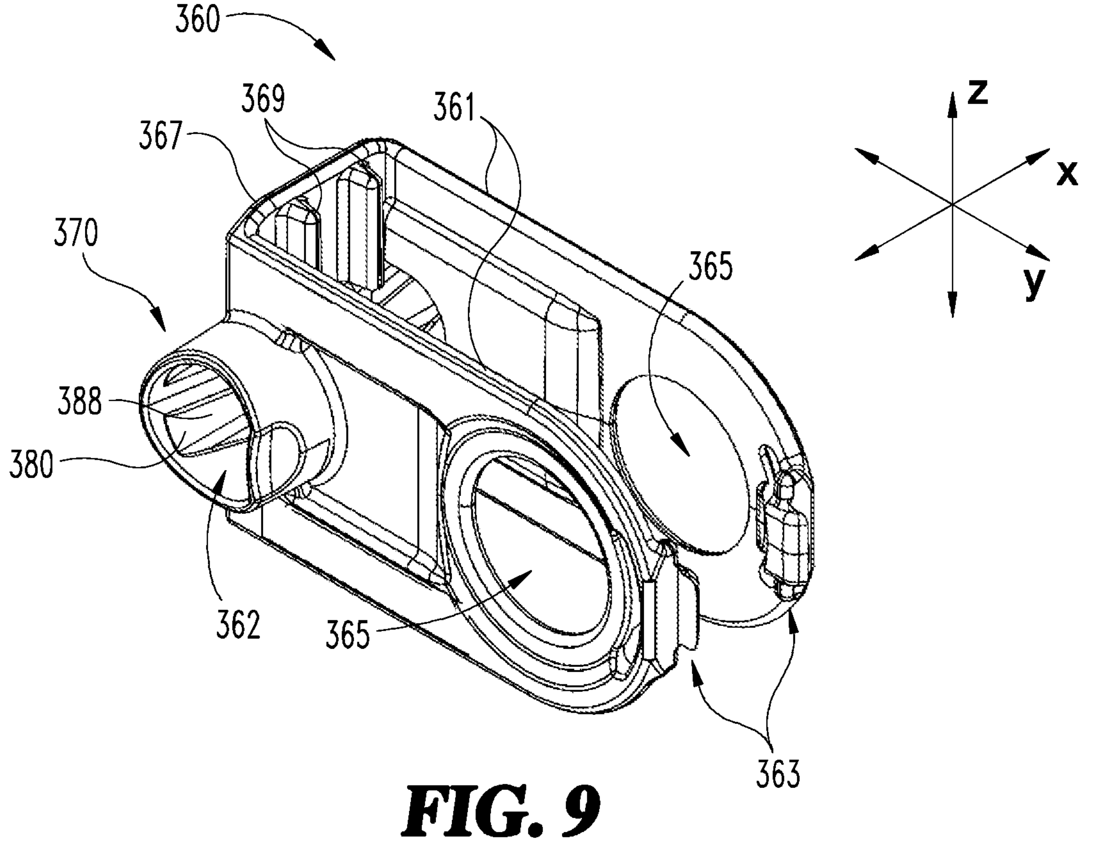
FIG. 9 is a perspective illustration of a retention bracket according to another embodiment.
Figure 10:
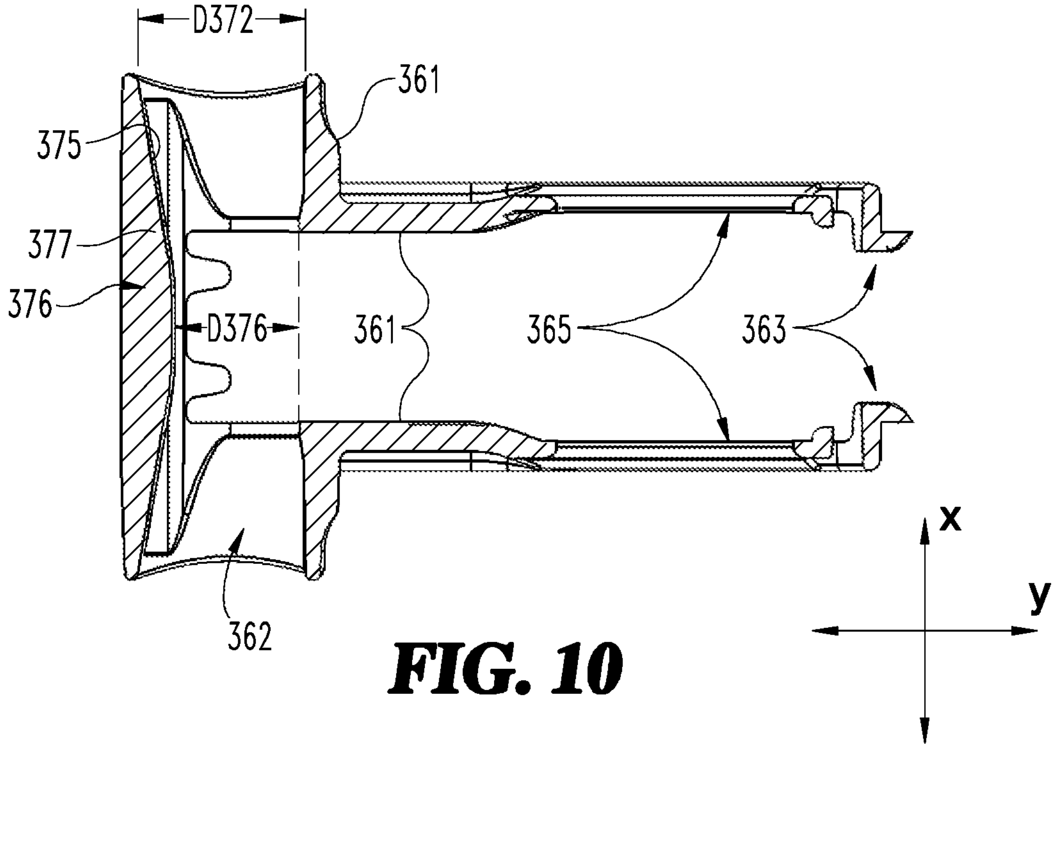
FIG. 10 is a cross-sectional illustration of the retention bracket illustrated in FIG. 9.

FIGS. 9 and 10 illustrate a retention mechanism 360 according to another embodiment. The retention mechanism 360 is substantially similar to the retention brackets 160, 260 described above. Unless stated otherwise, similar reference characters are used to indicate similar elements and features. For example, the retention mechanism 360 includes a pair of walls 361 extending laterally from an end piece 367, a plurality of collars 370 extending longitudinally from the walls 361, and a plurality of openings 362 defined by the collars 370. In the interest of conciseness, the following description of the retention mechanism 360 focuses primarily on features that are different from those described above with reference to the retention mechanisms 160, 260.

In the illustrated bracket 360, each sidewall 361 has a single collar 370 extending longitudinally outward therefrom, and the compliant element is provided as a convex rib 380 that extends longitudinally along the opening 362. The rib 380 includes a pair of ramped portions 375, each of which extends longitudinally outward from body portion 376 of the rib 380. The opening 362 has a first effective diameter D372 at the entryway of the collars 370, and a second effective diameter D376 defined in part by the body portion 376. The ramped portions 376 cause the effective diameter of the opening 362 to transition from the first effective diameter D372 to the second effective diameter D376 in a manner analogous to that described above with reference to the ramps 175 of the compliant element 180. The rib 380 may have a longitudinally-extending concavity 388 which guides the mounting post 102 as the post 102 is inserted into the opening 362.

In the illustrated embodiment, each laterally-extending sidewall 361 of the bracket 360 includes a tab 363 that extends longitudinally inward toward the other sidewall 361, and the end wall 367 includes at least one rib 369. While other forms are contemplated, in the illustrated embodiment, the end wall 367 includes a pair of transversely-extending ribs 369. With the bracket 360 mounted to the case 131, each of the tabs 363 is received in a corresponding one of the slots 133, and the ribs 369 engage the end of the case 131 such that the tabs 363 cooperate with the ribs 369 to snugly engage the bracket 360 to the case 131. The bracket 360 may be formed of a compliant material in order to enable the tabs 363 and ribs 369 to deflect or otherwise deform during installation of the bracket 360, and such deflection or deformation may aid in maintaining the position of the bracket 360 relative to the case 131.

Figure 11:
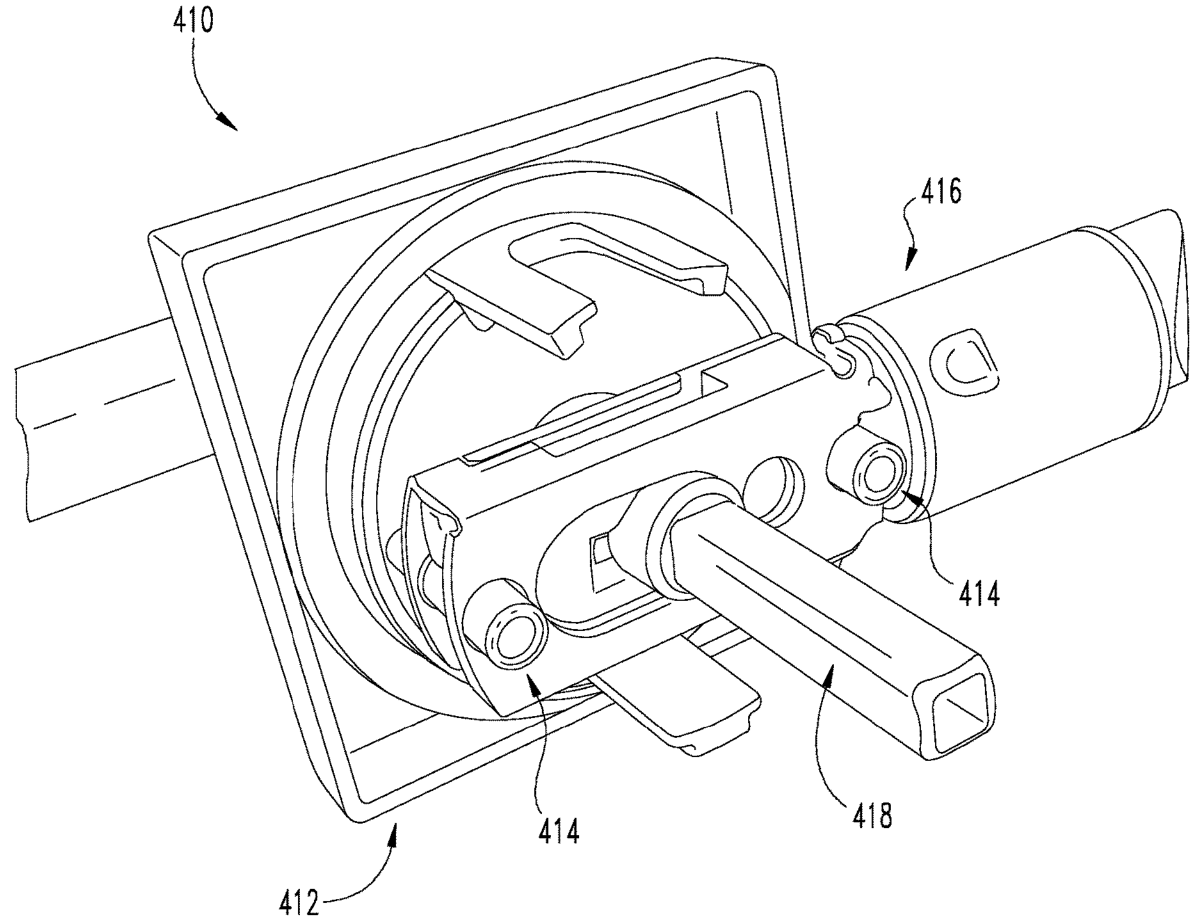
FIG. 11 (prior art)
FIGS. 11-13 illustrate conventional locksets.
Figure 12:
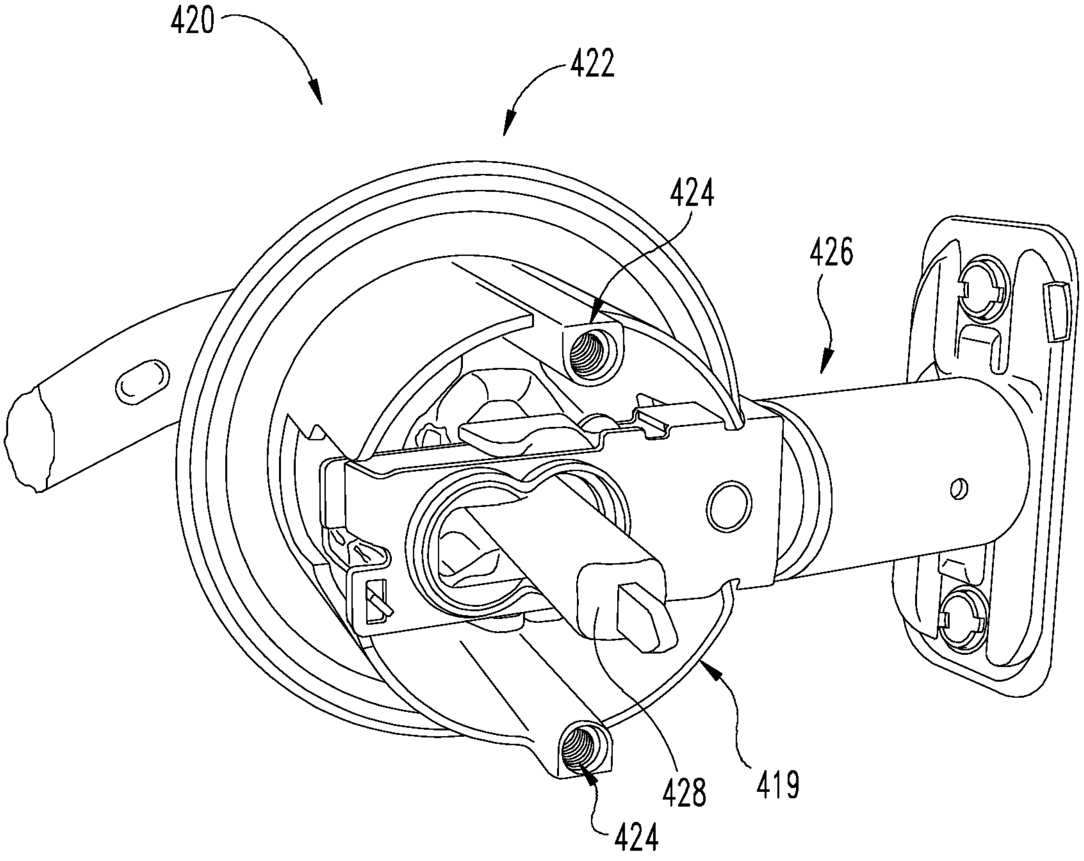
FIG. 12 (prior art)
Figure 13:
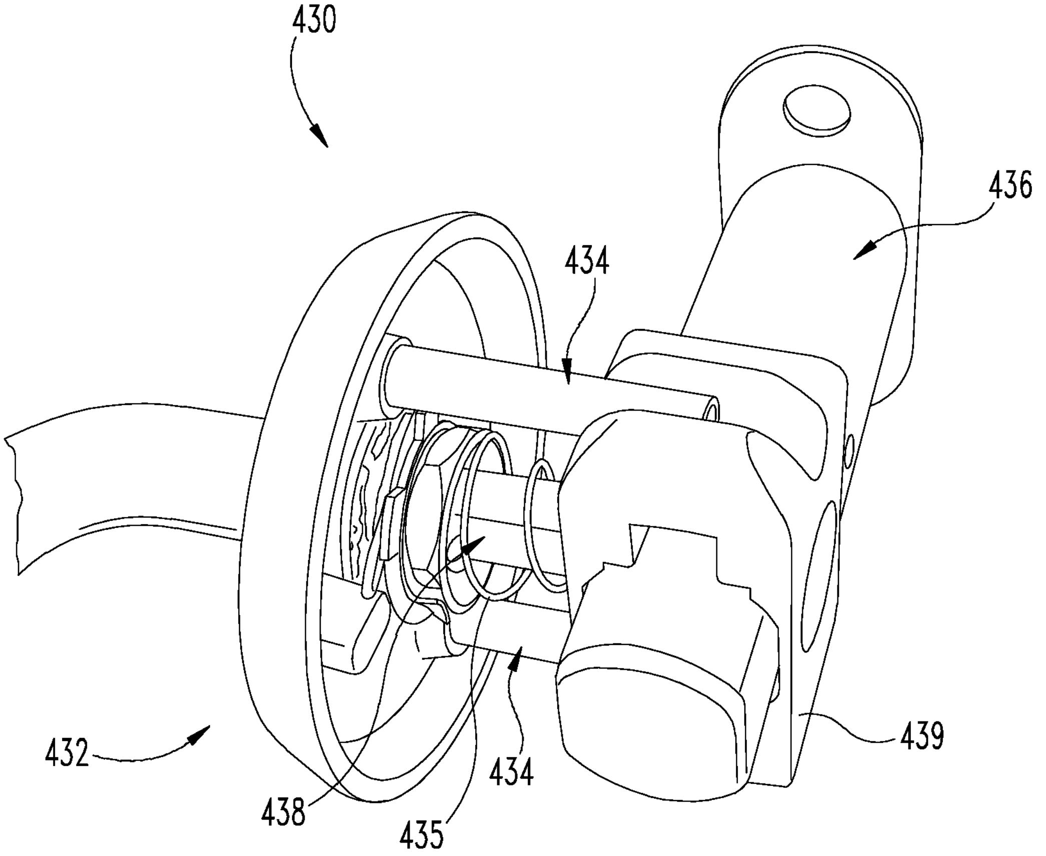
FIG. 13 (prior art)

FIGS. 11-13 illustrate locksets including conventional forms of structural and actuating interfaces. In the locksets illustrated in FIGS. 11-13, similar reference characters are used to indicate similar elements and features.

With reference to FIG. 11, a first conventional lockset 410 includes a structural interface including horizontally offset mounting posts 414 and an actuating interface including a single drive spindle 418. The lockset 410 also includes a chassis 412 and a latch mechanism 416. The mounting posts 414 are horizontally offset from one another and extend through a casing of the latch mechanism 416, thereby defining the structural interface. The single drive spindle 418 passes through a retractor of the latch mechanism 416, thereby defining the actuating interface. The single drive spindle 418 and both mounting posts 414 pass directly through the latch mechanism 416 with clearance fits, which are dictated by manufacturing tolerances. As a result of the clearance fits, the latch mechanism 416 is unable to counteract axial loads on the chassis assembly 412. Therefore, if an axial force were imparted to either the spindle 418 or the posts 414, such a force would tend to push the chassis assembly 412 away from the door and to a position that has reduced engagement with the latch mechanism 416. As such, this arrangement may result in reduced ease and/or efficiency of the installation process as compared with the installation of the above-described lockset 100.

With reference to FIG. 12, a second conventional lockset 420 includes an actuating interface including a single spindle 428 similar to that described above with reference to the lockset 410. In the lockset 420, however, the mounting posts 424 are vertically offset from one another, and do not directly engage the latch mechanism 426. As a result, this configuration requires extra material 429 on the chassis 422 in order to provide the necessary interface between the chassis 422 and the latch mechanism 426. When compared with the above-described lockset 100, this configuration may provide reduced orientation accuracy and reduced support for the mass of the chassis 422. Like the modification illustrated in FIG. 8, this arrangement is also susceptible to shifting from an imparted axial force.

With reference to FIG. 13, a third conventional lockset 430 includes an actuating interface including a split spindle 434 which is urged into engagement with the latch mechanism 436 by a spring 435. The lockset 430 also includes a pair of vertically offset mounting posts 434 which do not directly engage the latch mechanism 436. As a result, this configuration requires extra material in the form of an alignment component 439, which receives the posts 434 and provides an intermediate interface between the outside chassis 432 and the latch mechanism 436. While this arrangement retains the benefit of offering independently operable handles, installation difficulty is increased for two reasons. First, the outside chassis 432 is continually urged away from the door surface due to the axial force from the spring 435. Second, the alignment component 439 extends beyond the footprint of the latch mechanism 436, and therefore does not fit through the edge bore 96. Thus, in order to interface the latch mechanism 436 with the alignment component 439, the alignment component 439 must be inserted into the cross bore 95 and manually held in the proper position while the latch mechanism 436 is inserted into the alignment component 439 via the edge bore 96. These difficulties may result in reduced ease and/or efficiency of the installation process as compared with the installation of the above-described lockset 100.

One aspect of the present disclosure relates to a method of installing a lockset on a door having a lateral edge bore and a longitudinal cross-bore connected with the edge bore, wherein the lockset includes a first chassis and a latchbolt mechanism, wherein the first chassis includes a first mounting post, wherein the latch mechanism includes a latch housing and a retention mechanism coupled to the latch housing, and wherein the retention mechanism includes a first opening and at least one first rib extending into the first opening. The method comprises mounting the latch mechanism on the door, wherein mounting the latch mechanism includes inserting the latch housing and the coupled retention mechanism into the edge bore such that the housing extends into the cross-bore and the first opening of the retention mechanism is positioned in the cross-bore; and mounting the first chassis on the door, wherein mounting the first chassis includes inserting the first mounting post into the first opening and deforming the at least one first rib to form a first frictional interference fit between the first chassis and the latch mechanism.

In a refinement, the first chassis further comprises a first chassis housing, the first mounting post extends longitudinally from the first chassis housing, and mounting the first chassis further includes urging the first chassis housing into abutment with a first surface of the door. In another refinement, the first chassis further includes a second mounting post, the retention mechanism further includes a second opening and at least one second rib extending into the second opening, and mounting the first chassis further includes inserting second mounting post into the second opening and deforming the at least one second rib to form a second frictional interference fit between the first chassis and the latch mechanism. In a further refinement, the first chassis further includes a drive spindle and a spring, and the latch mechanism further comprises a retractor connected to the latchbolt, the drive spindle is rotatably and slidably mounted to the chassis housing and the spring urges a distal end of the drive spindle away from the chassis housing, mounting the first chassis further includes engaging the distal end of the drive spindle with the retractor and deforming the spring, the spring urging the chassis housing away from the latch mechanism with a proximal biasing force, and the first frictional interference fit resists the proximal biasing force and retains position of the first chassis.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A latch mechanism adapted for mounting on a door, comprising:

a latch housing;

a door latchbolt movably mounted in the latch housing for displacement between a retracted position and an extended position; and a retention mechanism mounted to the latch housing, the retention mechanism comprising an opening;

wherein the latch housing and the retention mechanism comprise a stem sized and configured to be received in a circular bore; and wherein the retention mechanism comprises a compliant material having an initial state and a deformed state, wherein the opening has a first size when the compliant material is in the initial state and a second size greater than the first size when the compliant material is in the deformed state, and wherein the compliant member is configured to deform from the initial state to the deformed state in response to insertion of a post through the opening to thereby cause the retention mechanism to grip the post.

2. The latch mechanism of claim 1, wherein the retention mechanism comprises a living hinge including a slot intersecting the opening.

3. The latch mechanism of claim 1, wherein the compliant material frictionally engages the post when in the deformed state to grip the post.

4. The latch mechanism of claim 1, wherein the circular bore has a diameter of one inch.

5. A latch mechanism, comprising:

a latch housing;

a latchbolt movably mounted in the latch housing; and a retention mechanism mounted to the latch housing, the retention mechanism comprising an opening;

wherein the retention mechanism comprises a compliant material configured to deform in response to insertion of a post through the opening to thereby cause the retention mechanism to grip the post, wherein the retention mechanism comprises a rib formed of the compliant material, and wherein at least a portion of the rib is positioned in the opening.

6. The latch mechanism of claim 5, wherein the rib comprises a ramp.

7. A lockset, comprising:

a latch mechanism, comprising:

a latch housing;

a latchbolt movably mounted in the latch housing;

a retention mechanism mounted to the latch housing, the retention mechanism comprising an opening; and a chassis comprising a housing and a post; and wherein the retention mechanism comprises a compliant material configured to deform in response to insertion of the post through the opening, and wherein the post is gripped by the retention mechanism.

8. A retention bracket configured for use with a latch mechanism adapted for mounting on a door and including a housing and a latchbolt movably mounted in the housing for displacement between a retracted position and an extended position, the retention bracket comprising:

a first wall and a second wall, wherein the first wall and the second wall are offset from one another and are structured to receive the housing therebetween, wherein an opening extends through the first wall and the second wall; and a compliant material configured to deform from a natural state to a deformed state in response to insertion of a post through the opening to thereby cause the retention bracket to grip the post.

9. The retention bracket of claim 8, further comprising a living hinge including a slot intersecting the opening.

10. The retention bracket of claim 8, further comprising a rib formed of the compliant material; and wherein at least a portion of the rib is positioned in the opening.

11. The retention bracket of claim 8, wherein the opening has a first size when the compliant material is in the natural state and a second size greater than the first size when the compliant material is in the deformed state.

12. A retention bracket configured for use with a latch mechanism including a housing, the retention bracket comprising:

a first wall and a second wall, wherein the first wall and the second wall are offset from one another and are structured to receive the housing therebetween, wherein an opening extends through the first wall and the second wall; and a compliant material configured to deform from a natural state to a deformed state in response to insertion of a post through the opening to thereby cause the retention bracket to grip the post; and wherein the retention bracket is sized and shaped to be received in a circular bore having a diameter of one inch.

13. An apparatus, comprising:

a retention bracket, comprising:

a first wall and a second wall, wherein the first wall and the second wall are offset from one another and are structured to receive the housing therebetween, wherein an opening extends through the first wall and the second wall; and a compliant material configured to deform from a natural state to a deformed state in response to insertion of a post through the opening to thereby cause the retention bracket to grip the post; and a latch mechanism including a housing;

wherein the housing of the latch mechanism is received between the first wall and the second wall of the retention bracket; and wherein the latch mechanism further comprises a latchbolt movably mounted in the housing.

14. The apparatus of claim 13, further comprising a chassis;

wherein the chassis comprises a chassis housing and the post; and wherein the post extends through the opening and is gripped by the retention bracket.

15. A method, comprising:

inserting a stem of a latchbolt mechanism through an edge bore of a door such that an opening formed in the stem is received in a cross-bore of the door, wherein the stem comprises a retention mechanism comprising a compliant material; and inserting a mounting post into the opening, thereby deforming the compliant material such that the mounting post is gripped by the retention mechanism.

16. The method of claim 15, wherein the mounting post is gripped by the retention mechanism with a frictional interference fit.

17. The method of claim 15, wherein insertion of the mounting post into the opening expands the opening from a first effective diameter to a second effective diameter greater than the first effective diameter.

18. The method of claim 15, wherein, prior to insertion of the mounting post into the opening, an inner diameter of the opening is less than an outer diameter of the mounting post.

19. The method of claim 15, wherein the retention mechanism comprises a living hinge that expands upon insertion of the mounting post into the opening.

20. The method of claim 15, wherein the edge bore has a diameter of one inch.

* * * * *